United States Patent
Wang et al.

(10) Patent No.: US 10,657,442 B2
(45) Date of Patent: May 19, 2020

(54) DEEP LEARNING ACCELERATOR ARCHITECTURE WITH CHUNKING GEMM

(71) Applicant: International Business Machines Corporation, Armonk, NY (US)

(72) Inventors: Naigang Wang, Ossining, NY (US); Jungwook Choi, Elmsford, NY (US); Kailash Gopalakrishnan, San Jose, CA (US); Daniel Brand, Millwood, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 83 days.

(21) Appl. No.: 15/957,711

(22) Filed: Apr. 19, 2018

(65) Prior Publication Data
US 2019/0325301 A1   Oct. 24, 2019

(51) Int. Cl.
*G06N 3/08*   (2006.01)
*G06F 17/16*   (2006.01)
*G06F 7/483*   (2006.01)

(52) U.S. Cl.
CPC ............ *G06N 3/08* (2013.01); *G06F 7/483* (2013.01); *G06F 17/16* (2013.01)

(58) Field of Classification Search
None
See application file for complete search history.

(56) References Cited

U.S. PATENT DOCUMENTS

| | | | |
|---|---|---|---|
| 9,710,265 B1 * | 7/2017 | Temam | G06F 9/3001 |
| 10,167,800 B1 * | 1/2019 | Chung | F02D 41/1405 |
| 2017/0357891 A1 * | 12/2017 | Judd | G06N 3/063 |
| 2017/0372202 A1 | 12/2017 | Ginsburg et al. | |
| 2018/0322382 A1 * | 11/2018 | Mellempudi | G06N 3/0445 |
| 2019/0057061 A1 * | 2/2019 | Targowski | G06F 15/8015 |
| 2019/0057303 A1 * | 2/2019 | Burger | G06N 3/0635 |

FOREIGN PATENT DOCUMENTS

CN   10661694 A   5/2017

OTHER PUBLICATIONS

Moss et al., "A Customizable Matrix Multiplication Framework for the Intel HARPv2 Xeon+FPGA Platform," FPGA'18, Feb. 2018, ACM, pp. 107-116.

Nurvitadhi et al., "Can FPGAs Beat GPUs in Accelerating Next-Generation Deep Neural Networks," FPGA'17, Feb. 2017, ACM, 10 pages.

* cited by examiner

Primary Examiner — Michael D. Yaary
(74) Attorney, Agent, or Firm — Garg Law Firm, PLLC; Rakesh Garg; Joseph Petrokaitis

(57) ABSTRACT

A compute matrix is configured to include a set of compute units, each compute unit including a multiplier and an accumulator, each of the multiplier and the accumulator formed using at least one floating point unit (FPU). An accumulator array is configured to include a set of external accumulators. The compute matrix is operated to produce a chunk dot-product using a first chunk of a first input vector and a first chunk of a second input vector. The accumulator array is operated to output a dot-product of the first input vector and the second input vector using the chunk dot-product.

18 Claims, 7 Drawing Sheets

*FIGURE 3*
*(PRIOR-ART)*

DEEP LEARNING ACCELERATOR ARCHITECTURE WITH CHUNKING GEMM

TECHNICAL FIELD

The present invention relates generally to a method, system, and computer program product for optimizing computations involved in deep neural networks. More particularly, the present invention relates to a method, system, and computer program product for deep learning accelerator architecture with chunking GEMM.

BACKGROUND

General Matrix Multiplication (GEMM) is the process of multiplying two matrices. Dot-product is a computation performed in GEMM. Dot-product specifically involves multiplying two vectors. A vector is a set of values, which are organized in the form of an array. An array is a single row or single column matrix, i.e., a one-dimensional matrix.

Suppose that $\vec{a}$ is a vector $(a_1, a_2, a_3)$ and $\vec{b}$ is another vector $(b_1, b_2, b_3)$. In the accompanying drawings, a vector is also denoted as a letter with an arrow above the letter). The dot-product of $\vec{a}$ and $\vec{b}$ is shown as $\vec{a} \cdot \vec{b}$ and has the value $(a_1 {*} b_1)+(a_2 {*} b_2)+(a_3 {*} b_3)$. In a specific example, suppose that $\vec{a}$ vector $(0, 3, -7)$ and $\vec{b}$ is vector $(2, 3, 1)$. The dot-product of $\vec{a}$ and $\vec{b}$ is $\vec{a} \cdot \vec{b} = (0{*}2)+(3{*}3)+(-7{*}1)=2$.

The multiplication computation in a dot-product is referred to as a "product." For example, $a_1{*}b_1$ is a product. The addition computation in a dot-product is referred to as an "accumulation." For example, the addition of products $a_1{*}b_1$ and $a_2{*}b_2$ is an accumulation. Thus, a dot-product involves several product computations and several accumulation computations.

The vectors in a dot-product can be of any size. Vectors containing hundreds or thousands of values are not uncommon. Furthermore, the values in the vectors can be of any precision. For example, a value in a vector can be 4, −3.01, 0.0000000005023, and the like. Furthermore, in a dot-product computation, a value of any precision in one vector can participate in a product operation with another value of any precision from the other vector. A product obtained in computing a dot-product can be of any precision and might accumulate with another product of any precision.

Deep learning neural networks, also referred to as Deep Neural Networks (DNN) are a type of neural networks. The configuring and training of DNNs employs dot-product computations. Over the course of the training of a DNN, many dot-products have to be computed at each iteration or cycle of training. Because the DNNs can include thousands if not millions of nodes, the scale of the dot-product computations can include vectors comprising thousands or even millions of values, many of which can be precise to any number of decimal places, e.g., the fifth, fifteenth, fiftieth decimal place or even more.

SUMMARY

The illustrative embodiments provide a method, system, and computer program product. An embodiment includes a method that configures a compute matrix comprising a set of compute units wherein each compute unit comprises a multiplier and an accumulator, each of the multiplier and the accumulator formed using at least one floating point unit (FPU). The embodiment configures an accumulator array comprising a set of external accumulators. The embodiment operates the compute matrix to produce a chunk dot-product using a first chunk of a first input vector and a first chunk of a second input vector. The embodiment operates the accumulator array to output a dot-product of the first input vector and the second input vector using the chunk dot-product.

An embodiment includes a computer usable program product. The computer usable program product includes a computer-readable storage device, and program instructions stored on the storage device.

An embodiment includes a computer system. The computer system includes a processor, a computer-readable memory, and a computer-readable storage device, and program instructions stored on the storage device for execution by the processor via the memory.

BRIEF DESCRIPTION OF THE DRAWINGS

Certain novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

Dot-product microarchitecture, also referred to herein as dot-product architecture, is a specialized hardware that is specifically configured to perform dot-product computations. A dot-product architecture includes a matrix of compute units. Each compute unit comprises a specialized processing circuit and a memory. The specialized processing circuit comprises one or more floating point computation units (FPU). The specialized processing circuit and the memory are configured into two specific components in the compute unit, namely a multiplier and an accumulator. In some cases, the multiply-add is regarded as one unit, i.e. multiplier-accumulator (MAC) unit.

For example, the FPU in our chip design has fused multiply-accumulate unit (FMA) which does the multiply-accumulation using one instruction.

The multiplier and the accumulator are both configured to perform floating point computations on floating point numbers. The memory is used to store the computation inputs, intermediate results of a computation, the final result of a computation, or some combination thereof.

An FPU has a bit-width. The bit-width is a size, in terms of a number of binary bits used in a floating-point computation. The larger the bit-width the more complex, and larger, the compute unit, and consequently larger the dot-product architecture. The larger the dot-product architecture, the more time and computing resources it consumes to produce a dot-product.

Specialized computation circuits, and especially dot-product architectures, are a well-recognized technological field of endeavor. The present state of the technology in this field of endeavor has certain drawbacks and limitations. The operations and configurations of the illustrative embodiments impart additional or new capabilities to improve the existing technology in this technological field of endeavor, especially in the area of reducing accumulation errors in GEMM through optimizing the dot-product architecture used for dot-product computations in GEMM.

This optimization of the dot-product architecture hardware results in improving another well-recognized technological field of endeavor, namely, neural network training. Specifically, a dot-product architecture configured and operated in accordance with an illustrative embodiment improves the precision with which weights are computed and/or adjusted in a neural network, especially, in configuring a DNN.

The illustrative embodiments recognize that presently, dot-product architectures suffer from a problem concerning the precision of the dot-product computation. Dot-product architectures are presently available in two configurations—the multiplier and the accumulator both using the same bit-width FPUs (large multiplier), or the accumulator using a higher bit-width FPU than the multiplier (large accumulator). Presently available configurations use either 32-bit multiplier and 32-bit accumulator, or 16-bit multiplier and 32-bit accumulator.

One way in which this error manifests itself is as an accumulation error. Essentially, if two high precision numbers are added (accumulated) in a low precision accumulator, the least-significant portion of the values are dropped or rounded, resulting in an inaccurate accumulation result. The inaccuracy in the accumulation result, given the precision of the products that are inputs to the accumulation, is the accumulation error. The bit-width of accumulator cannot generally be reduced even when the multiply bit-width is decreased due to the possibility of increased accumulation error, t.

For example, suppose that in one case, the accumulator inputs are 1.0 and 0.0005. If a 32-bit (32 bit-width) FPU is used to accumulate these inputs, the accumulator output is 1.0005. however, if a 16-bit (16 bit-width) FPU is used to accumulate these inputs, the accumulator output is 1.0, introducing an accumulation error of 0.0005.

Even when the same bit-width FPUs are used for the multiplier and the accumulator, the bit-width may not be sufficient for the required computation. As a result, other types of errors are also introduced. As another example, the computation (1.0(2)+0.00000000001(2))*20 is performed as 1.0*20, and 0.00000000001 is omitted due to bit-width limitation in the multiplier, the accumulator, or both. This omission introduces an error. Similarly, if one product is 1.0*2 and another product is 0.00000000001*0.002, even if the FPU bit-widths of both the multiplier and the accumulator are large enough for each value being multiplied, the bit-width in the accumulator may not be large enough for holding the result of the multiplication. As a result, errors are introduced in the computations even when great expense of time and architectural complexity has been incurred for those computations.

The present state of the technological field of endeavor of dot-product architectures presently does not include a mechanism to mitigate such errors, except using large accumulators in the configuration. A need exists for reducing the accumulation errors and other errors caused in the operation of dot-product architectures while also simultaneously reducing accumulator bit-width. A need exists that such reduction or mitigation of the errors not add further complexity to the dot-product architectures. A need exists that such mitigation also not increase other computation costs, such as computation time.

The illustrative embodiments recognize that the presently available tools or solutions do not address these needs/problems or provide adequate solutions for these needs/problems. The illustrative embodiments used to describe the invention generally address and solve the above-described problems and other related problems by deep learning accelerator architecture with chunking GEMM.

An embodiment can be implemented as a combination of certain hardware components and a software application. An implementation of an embodiment, or one or more components thereof, can be configured as a modified dot-product architecture, which is operated using a hardware, software, or firmware operating component. An embodiment can be configured as a modified, with a companion software application executing in some combination of (i) the modified dot-product architecture itself, (ii) a data processing system communicating with the modified dot-product architecture over a suitable network, or (iii) some combination of (i) and (ii).

An embodiment configures a modified dot-product architecture with two segments. In the first segment, the embodiment configures a compute matrix, which is a matrix of compute units. The compute matrix is a smaller matrix of compute units as compared to a matrix of compute units in a prior-art dot-product architecture. In the second segment, the embodiment configures an array of accumulators.

The two segments operating together reduce or otherwise mitigate an error in the computed dot-product. Given the same vector inputs for a dot-product computation, the modified dot-product architecture includes fewer compute units than a number of compute units configured in a prior-art dot-product architecture, and the two segments of the modified dot-product architecture operating together produce a dot-product output in substantially the same or less time as compared to the time taken by the prior-art dot-product architecture to produce its dot-product output the dot-product, assuming that the compute units in both dot-product architectures are configured using similar FPUs and memories.

Furthermore, given two vector inputs for computing the dot-product, the modified dot-product architecture is capable of producing a more accurate dot-product as compared to the prior-art dot-product architecture. In other words, an output of the modified dot-product architecture approaches an ideally precise dot-product answer more closely (i.e., the output of the modified dot-product architecture has a smaller error relative to the ideal answer as compared to the error of the output of the prior-art dot-product architecture) than the prior-art dot-product architecture, using similar compute units but a smaller number of compute units than the prior-art dot-product architecture, and in substantially equal or less time as the prior-art dot-product architecture.

The illustrative embodiments recognize that an accumulation error grows when a large number of products are accumulated or added together using the same accumulator configuration. For example, suppose that 16-bit accumulators are used to accumulate products computed using 32-bit FPUs. Using such a configuration, assume that a first accumulator in a prior-art matrix computes 1.0+0.00005 and produces an output of 1.0 with an error of 0.00005. The next accumulator similarly produces an output of 2.1+0.0009 as 2.1 with an error of 0.0009. In computing the dot-product in this manner, the low precision accumulator has produces a dot-product of 1.0+2.1=3.1, with a magnified the total error of 0.00095 from the ideal dot-product output of 1.00005+2.1009=3.10095.

This error grows, and increasingly digresses from the ideal dot-product output at each stage of the computation. The larger the input vector, the greater the error. In other words, the illustrative embodiments recognize that at least the accumulation error in a dot-product computation is a proportional function of the size of the input vectors.

In the prior-art configurations, even though the multiplier bit-width can be decreased, the bit-width of accumulator is not reduced because of the risk of increasing the accumulation error. To solve this problem, the illustrative embodiments introduce chunking so that the bit-width of accumulator can be decreased, and the architecture simplified. The controlled accumulation error made possible using the illustrative embodiments allows lowering of the multiplier bit-width below the bit-widths used in prior-art architectures, enabling further simplification of the architecture.

To use the two-segment configuration of a modified dot-product architecture, an embodiment partitions the input vectors into chunks. A chunk is a portion of a vector, i.e., a chunk includes a subset of the values from a set of values in the vector. Different chunks have different non-overlapping subsets of the set of values in the vector. Chunking is the process of dividing an input vector into chunks. Both input vectors are chunked in this manner.

In one embodiment, all chunks of an input vector are of the same size, i.e., include the same number of values in their respective non-overlapping subsets of values. In another embodiment, different chunks of a vector can be of different sizes, i.e., two chunks from the same vector can have different numbers of values in their respective non-overlapping subsets of values.

The rationale behind chunking is that when smaller dot-product is computed from small chunks as compared to the entire vectors, the accumulation error for a small chunk cannot digress from the ideal answer as much as the accumulation error would without chunking. An embodiment uses the first segment of the modified dot-product architecture to compute the chunk dot-products for each chunk-pair (a chunk from the first input vector and a corresponding chunk from the other input vector). Each chunk dot-product might contain an accumulation error or another error due to precision of the configured bit-widths, but because the chunk itself is smaller than the entire vector, such errors are also correspondingly smaller.

Furthermore, one embodiment determines the chunk size that would produce a chunk dot-product that only includes an error that does not exceed a deviation tolerance. A deviation tolerance is a threshold amount of deviation of the computed chunk dot-product for a given chunk pair from the ideal dot-product for that chunk-pair.

An embodiment configures the second segment to perform no multiplication operations but only accumulation operations. In one embodiment, an accumulator unit in the one-dimensional array of accumulators is an advantageously simpler circuit than the FPU of the first segment and is configured only for accumulation operation. In another embodiment, an accumulator unit in the one-dimensional array of accumulators is a multifunctional circuit, such as an FPU, but is repurposed only for accumulation operation, hence the operation of the multifunctional circuit is advantageously simplified.

Furthermore, an embodiment configures the bit-width of an accumulator unit in the second segment independently from the accumulators operating in the compute units in the first segment. For example, even if the compute units in the first segment use a low-precision accumulator (small bit-width accumulator, e.g., 16-bit as compared to 32-bit accumulator), the accumulator units in the second segment can use a high-precision accumulator (large bit-width accumulator, e.g., 32 or 64-bit wide).

An embodiment uses the second segment to accumulate the chunk dot-products. As already noted, the chunk dot-products have a smaller error as compared to the error when computing dot-product with entire vectors as inputs. Now, when the chunk dot-products are accumulated together in a customizable accumulator array of the second segment, the second segment introduces no error, or at most an additional error that still keeps the total error significantly smaller as compared to the total error in the output from a prior-art dot-product architecture.

Thus, where the prior-art dot-product architecture performs, $$\vec{a} = (a_1, a_2, a_n)$$

$$\vec{b} = (b_1, b_2, \ldots b_n)$$

$$\vec{a} \cdot \vec{b} = (a_1, a_2, \ldots a_n) * (b_1, b_2, \ldots b_n) = \sum_{i=1}^{n} a_i \times b_i$$

the modified dot-product architecture performs, $$\vec{a} \cdot \vec{b} = (a_1, a_2, \ldots a_p) * (b_1, b_2, \ldots b_p) +$$
$$(a_{p+1}, a_{p+2}, \ldots a_q) * (b_{p+1}, b_{p+2}, \ldots b_q) +$$
$$\ldots + (a_{r+1}, a_{r+2}, \ldots a_n) * (b_{r+1}, b_{r+2}, \ldots b_n) =$$
$$\sum_{1}^{number\ of\ chunks} \sum_{chunk\ index=chunk\ start}^{chunk\ end} (a_{chunk\ index} \times b_{chunk\ index})$$

The manner of deep learning accelerator architecture with chunking GEMM described herein is unavailable in the presently available methods in the technological field of endeavor pertaining to specialized computation circuits, and especially dot-product architectures. A method of an embodiment described herein, when implemented to execute on a device or data processing system, comprises substantial advancement of the functionality of that device or data processing system in providing a modified dot-product architectures which is less complex, is a smaller circuit configuration, produces a dot-product with smaller total error, and produces the dot-product in the same amount of time or less, as compared to a prior-art dot-product architecture.

The illustrative embodiments are described with respect to certain types of matrices, arrays, FPUs, memories, multipliers, accumulators, bit-widths, errors, tolerances, chunks, chunk sizes, results, algorithms, equations, neural network configurations, locations of embodiments, additional data, devices, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 1:
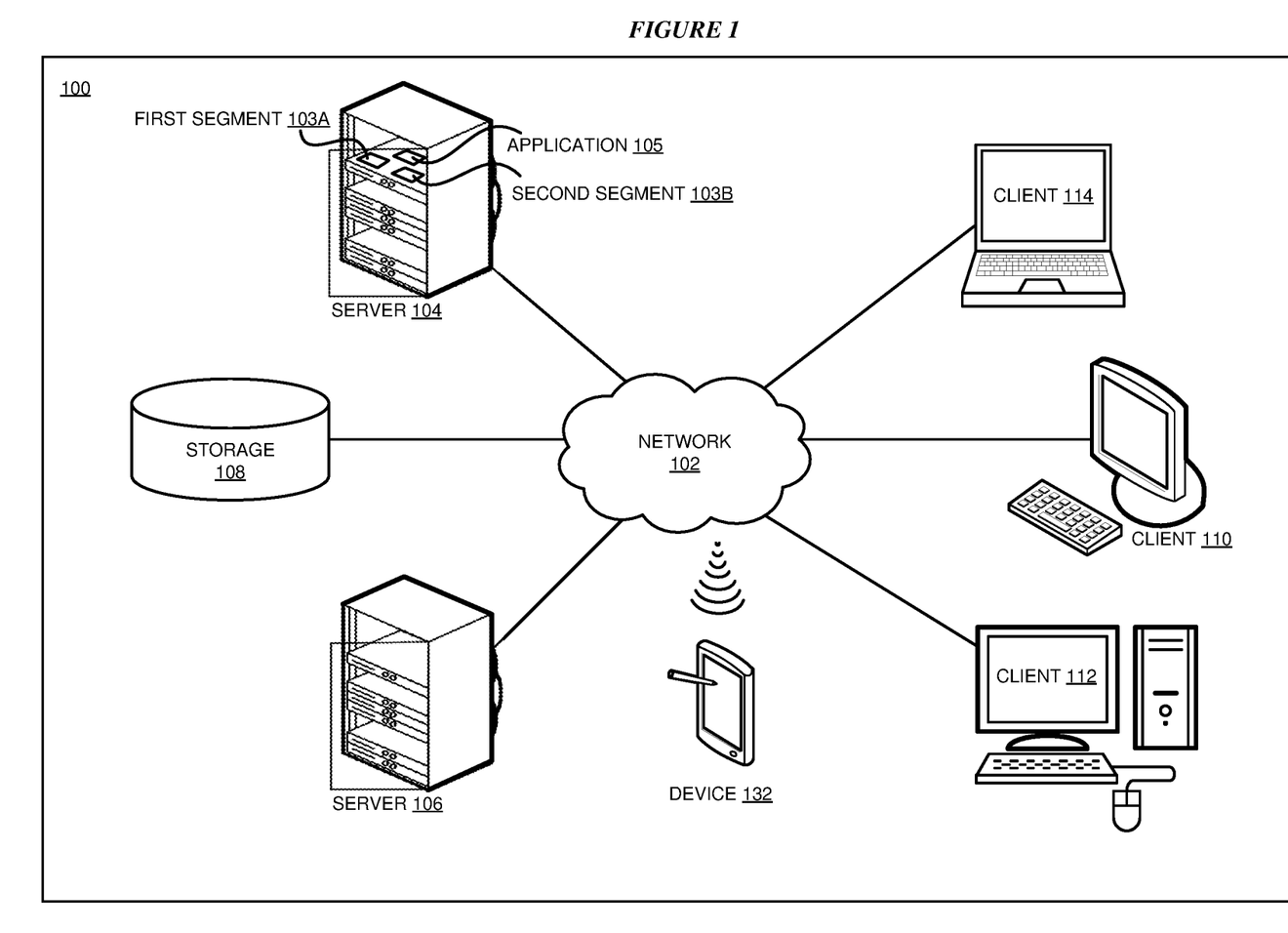
FIG. 1 depicts a block diagram of a network of data processing systems in which illustrative embodiments may be implemented.
Figure 2:
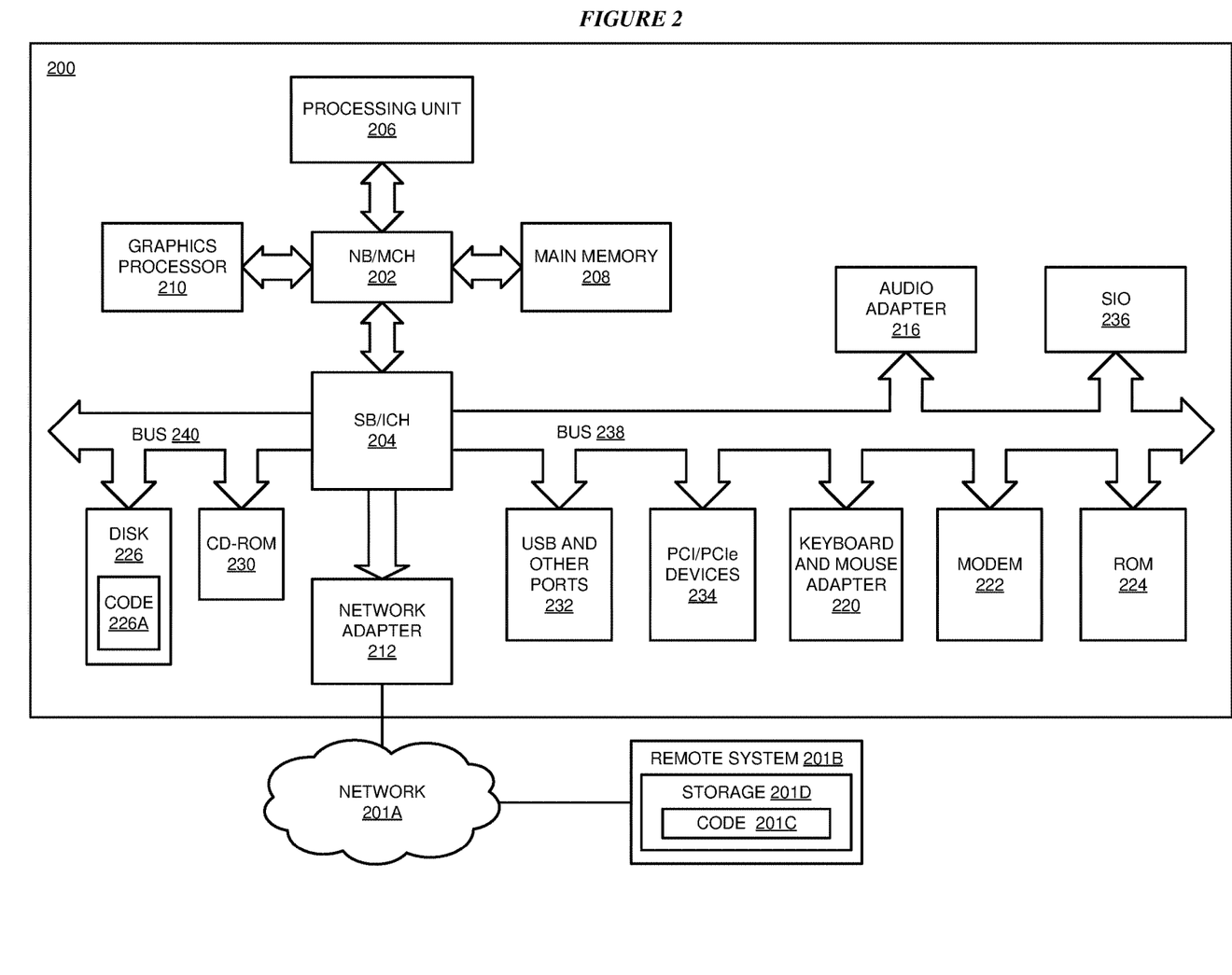
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. Software applications may execute on any computer in data processing environment 100. Clients 110, 112, and 114 are also coupled to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, servers 104 and 106, and clients 110, 112, 114, are depicted as servers and clients only as examples and not to imply a limitation to a client-server architecture. As another example, an embodiment can be distributed across several data processing systems and a data network as shown, whereas another embodiment can be implemented on a single data processing system within the scope of the illustrative embodiments. Data processing systems 104, 106, 110, 112, and 114 also represent example nodes in a cluster, partitions, and other configurations suitable for implementing an embodiment.

Device 132 is an example of a device described herein. For example, device 132 can take the form of a smartphone, a tablet computer, a laptop computer, client 110 in a stationary or a portable form, a wearable computing device, or any other suitable device. Any software application described as executing in another data processing system in FIG. 1 can be configured to execute in device 132 in a similar manner. Any data or information stored or produced in another data processing system in FIG. 1 can be configured to be stored or produced in device 132 in a similar manner.

Assume that server 104 is used for dot-product computation. For example, server 104 may be participating in training or configuring a DNN. First segment 103A and second segment 103B together form a modified dot-product architecture, according to an embodiment described herein. First segment 103A is a compute matrix of compute units and second segment 103B is an array of accumulators, according to an embodiment described herein. Application 105 implements an operating component in the manner of an embodiment described herein. Application 105 can be implemented in hardware, software, or firmware to operate first segment 103A and second segment 103B together as a modified dot-product architecture.

Servers 104 and 106, storage unit 108, and clients 110, 112, and 114, and device 132 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications. Data processing environment 100 may also take the form of a cloud, and employ a cloud computing model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service.

With reference to FIG. 2, this figure depicts a block diagram of a data processing system in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments.

Data processing system 200 is also representative of a data processing system or a configuration therein, such as data processing system 132 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system for any type of computing platform, including but not limited to server systems, personal computers, and mobile devices. An object oriented or other type of programming system may operate in conjunction with the operating system and provide calls to the operating system from programs or applications executing on data processing system 200.

Instructions for the operating system, the object-oriented programming system, and applications or programs, such as application 105 in FIG. 1, are located on storage devices, such as in the form of code 226A on hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

Furthermore, in one case, code 226A may be downloaded over network 201A from remote system 201B, where similar code 201C is stored on a storage device 201D. in another case, code 226A may be downloaded over network 201A to remote system 201B, where downloaded code 201C is stored on a storage device 201D.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Where a computer or data processing system is described as a virtual machine, a virtual device, or a virtual component, the virtual machine, virtual device, or the virtual component operates in the manner of data processing system 200 using virtualized manifestation of some or all components depicted in data processing system 200. For example, in a virtual machine, virtual device, or virtual component, processing unit 206 is manifested as a virtualized instance of all or some number of hardware processing units 206 available in a host data processing system, main memory 208 is manifested as a virtualized instance of all or some portion of main memory 208 that may be available in the host data processing system, and disk 226 is manifested as a virtualized instance of all or some portion of disk 226 that may be available in the host data processing system. The host data processing system in such cases is represented by data processing system 200.

Figure 3:
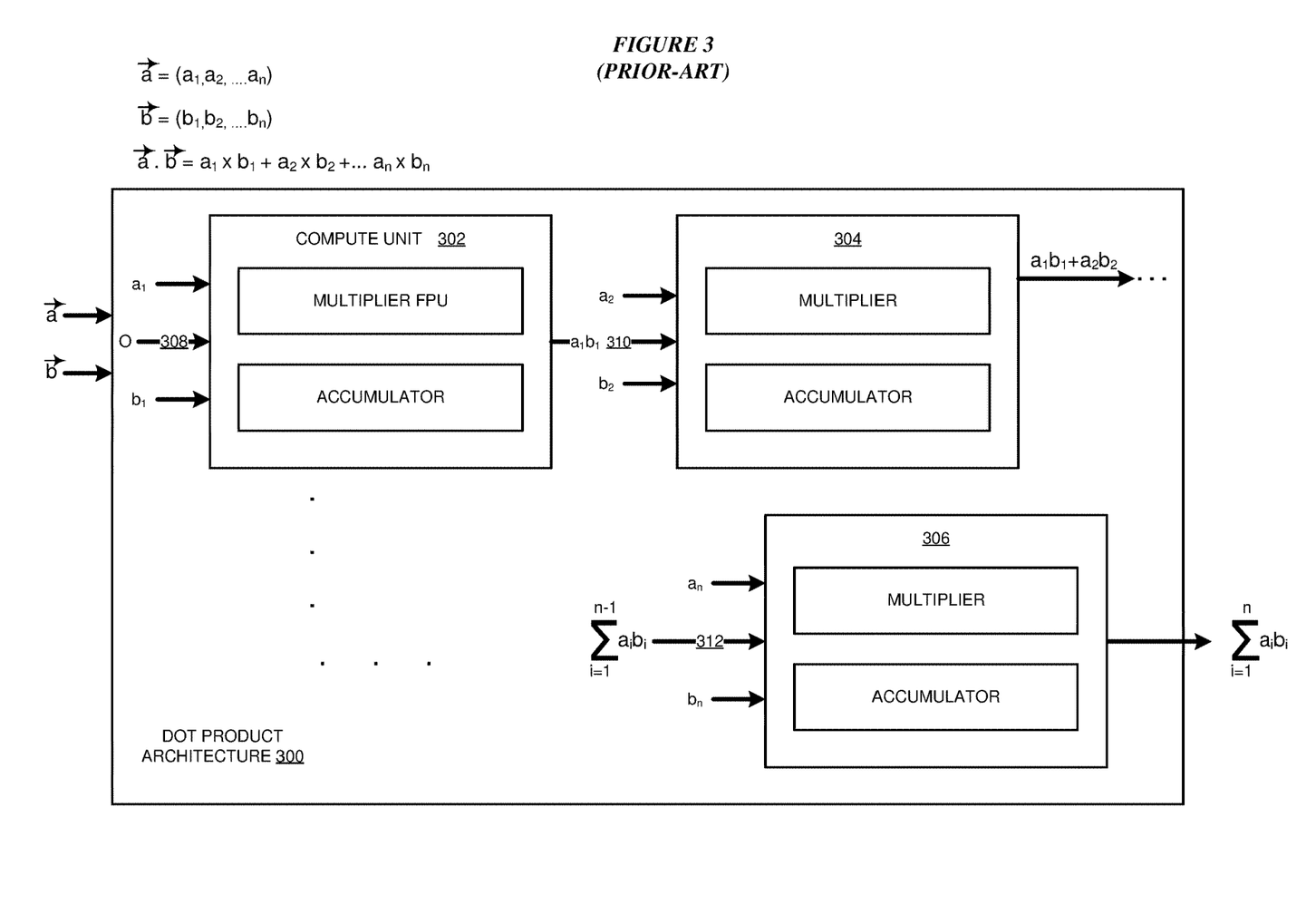
FIG. 3 depicts a block diagram of an example configuration for a prior-art dot-product architecture, which can be improved by an illustrative embodiment.

With reference to FIG. 3, this figure depicts a block diagram of an example configuration for a prior-art dot-product architecture, which can be improved by an illustrative embodiment. Dot-product architecture is a prior-art dot-product architecture, comprising a number of compute units 302, 304, . . . 306. Each compute unit accepts two values as inputs and an accumulation input. For example, compute unit 302 accepts value a1 from vector $\vec{a}$ as one input 308 and value b1 from vector $\vec{b}$ as another input. Compute unit 302 also accepts accumulation input 308. If compute unit 302 is the first compute unit in dot-product architecture 300, accumulation input 308 is zero. Otherwise, for the next compute unit 304, accumulation input 310 is $(0+a_1 b_1)$ for the n—the compute unit, the accumulation input is the accumulated output of the previous compute unit, i.e., $$\sum_{i=1}^{n-1} a_i \times b_i$$

as depicted by input 312. The dot-product output of dot-product architecture 300 is $$\sum_{i=1}^{n} a_i \times b_i$$

as described herein.

Figure 4:
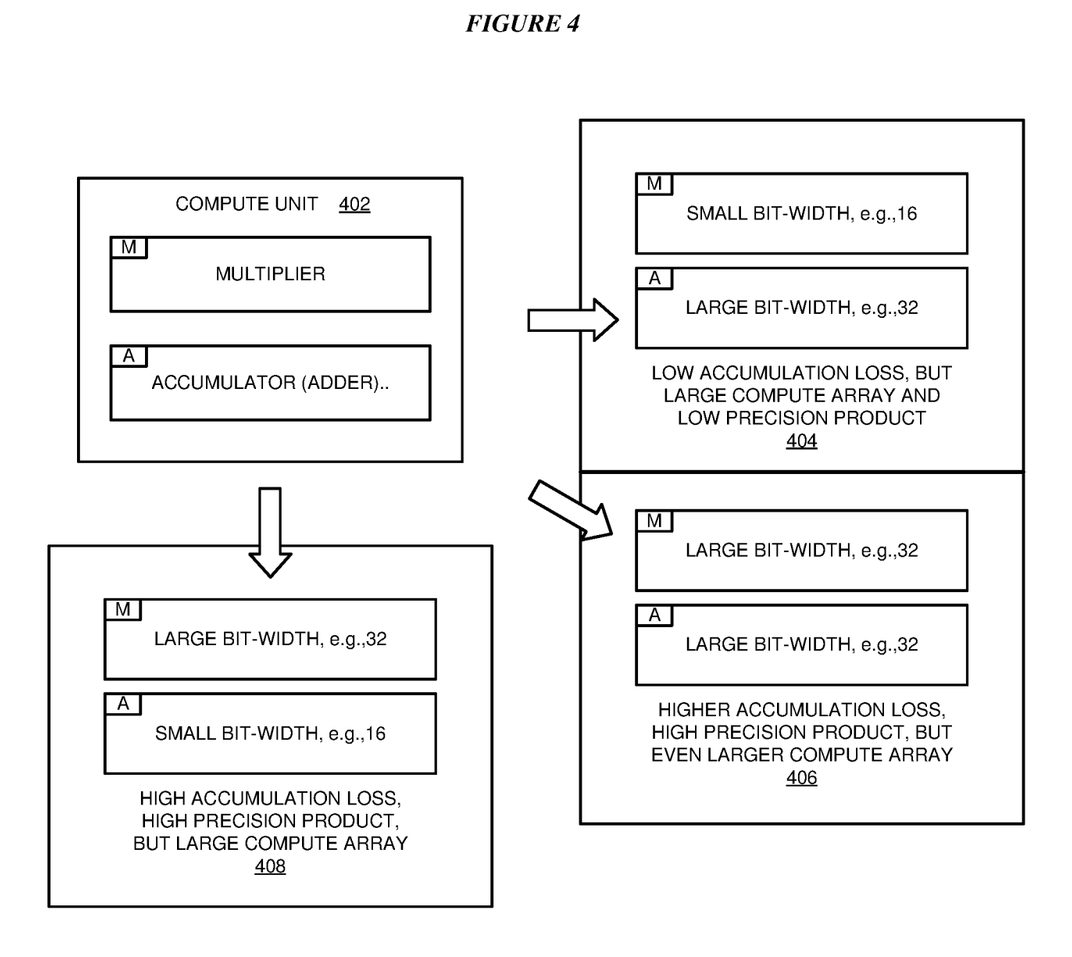
FIG. 4 depicts the undesirable choices presented by a prior-art dot-product architecture, which can be improved by an illustrative embodiment.

With reference to FIG. 4, this figure depicts the undesirable choices presented by a prior-art dot-product architecture, which can be improved by an illustrative embodiment. Compute unit 402 is an example of compute unit 302 in FIG. 3.

As described herein, compute unit 402 comprises multiplier "M" and accumulator "A" as shown. Some bit-width configuration alternatives are possible with compute unit 402 when configured in prior-art dot-product architecture 300 of FIG. 3. Assume two FPU options are available for configuring multiplier M and accumulator A—small bit-width FPU that uses 16 bits, and large bit-width FPU that uses 32 bits. These bit-widths are selected only for the clarity of description purposes without implying any limitation on the illustrative embodiments.

In one example configuration alternative 404, multiplier M is configured using the small bit-width FPU, and accumulator A is configured using the large bit-width FPU. In such a configuration, the small bit-width multiplier produces low precision products, but the large bit-width accumulator helps in reducing accumulation error for the reasons described earlier. However, the configuration of the resulting dot-product architecture 300 is still large because each compute unit has to be configured in this manner, and a large number of compute units are used in dot-product architecture 300.

In another example configuration alternative 406, multiplier M is configured using the large bit-width FPU, and accumulator A is also configured using the large bit-width FPU. In such a configuration, the large bit-width multiplier produces high precision products, but now the large bit-width accumulator is not as helpful in reducing the accumulation error as compared to configuration 404, for the reasons described earlier. And, the configuration of the resulting dot-product architecture 300 is even larger than configuration 404 because each compute unit has to be configured in this manner, and a large number of compute units are used in dot-product architecture 300.

In another example configuration alternative 408, multiplier M is configured using the large bit-width FPU, and accumulator A is configured using the small bit-width FPU. In such a configuration, the large bit-width multiplier produces high precision products, but the small bit-width accumulator greatly increases the accumulation error for the reasons described earlier. This configuration produces the worst accumulation error among the three configurations. However, the configuration of the resulting dot-product architecture 300 is still large and comparable to configuration 404 because each compute unit has to be configured in this manner, and a large number of compute units are used in dot-product architecture 300.

Those of ordinary skill in the art will appreciate that a configuration alternative with multiplier M is configured using the small bit-width FPU, and accumulator A configured using the small bit-width FPU is not desirable. Such a configuration often produces low precision dot-product with high deviation from ideal dot-product.

Figure 5:
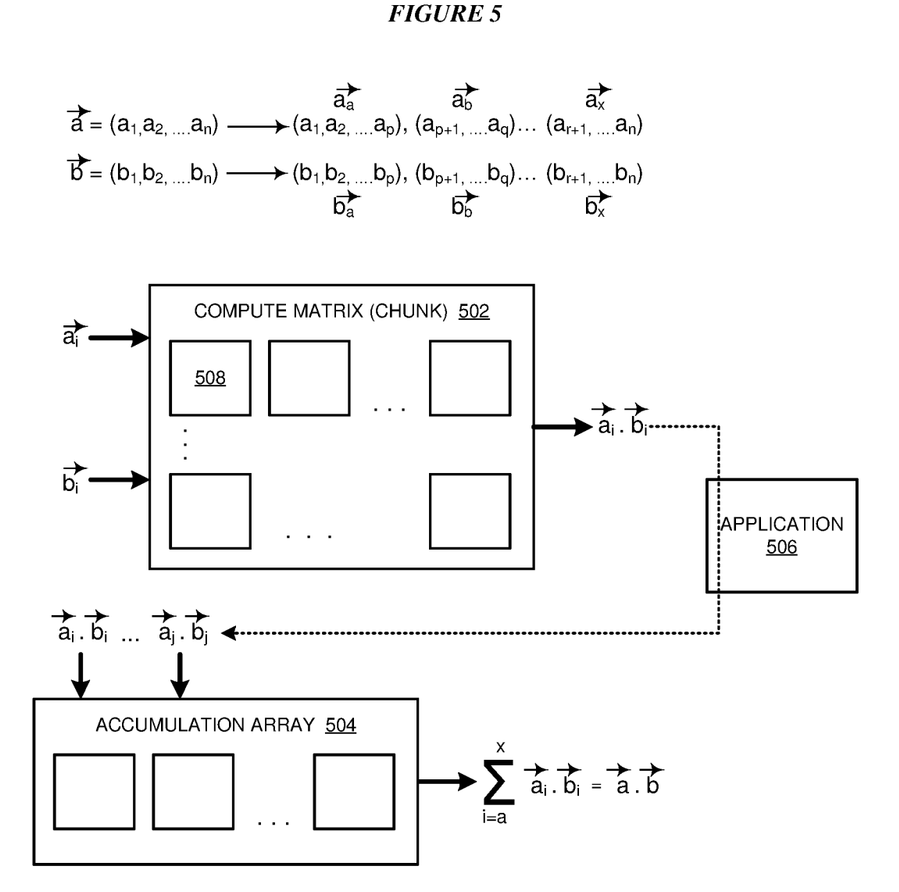
FIG. 5 depicts a block diagram of an example configuration for deep learning accelerator architecture with chunking GEMM in accordance with an illustrative embodiment.

With reference to FIG. 5, this figure depicts a block diagram of an example configuration for deep learning accelerator architecture with chunking GEMM in accordance with an illustrative embodiment. Compute matrix 502 is an example of first segment 103A in FIG. 1, and accumulator array 504 is an example of second segment 103B in FIG. 1. Application 506 is an example of application 105 and forms the operating component that operates compute matrix 502 and accumulator array 504 as the modified dot-product architecture modified dot-product architecture, as described herein.

Compute matrix 502 includes a set of compute units 508. Compute unit 508 is configured with a multiplier and an accumulator in the manner of compute unit 402. Compute unit 508 can be configured according to any of alternative configurations 404, 406, or 408, depending upon the contents of the chunks to be processed by compute matrix 502.

In one embodiment, the configuration of compute unit 508 can be altered from chunk to chunk. For example, given one pair of chunks $\vec{a}_k$ and $\vec{b}_k$, compute unit 508 can be configured in configuration 404, and given another pair of chunks $\vec{a}_x$ and $\vec{b}_x$, compute unit 508 can be configured in configuration 408, when it can be determined that changing the bit-width of the multiplier, the accumulator, or both, will not increase the accumulation error for a chunk dot-product beyond a deviation tolerance.

Accumulator array 504 includes a set of accumulators 510. Accumulator 510 is configured to only accumulate chunk dot-products.

In one embodiment, the configuration of accumulator 510 can be altered. For example, given one set of chunk dot-products $a_ib_i$ through $a_jb_j$, accumulator 510 can be configured with large bit-widths, and given another set of chunk dot-products $a_mb_m$ through $a_pb_p$, accumulator 510 can be configured with small bit-widths, when it can be determined that reducing the bit-width will not increase the accumulation error beyond a deviation tolerance.

Figure 6:
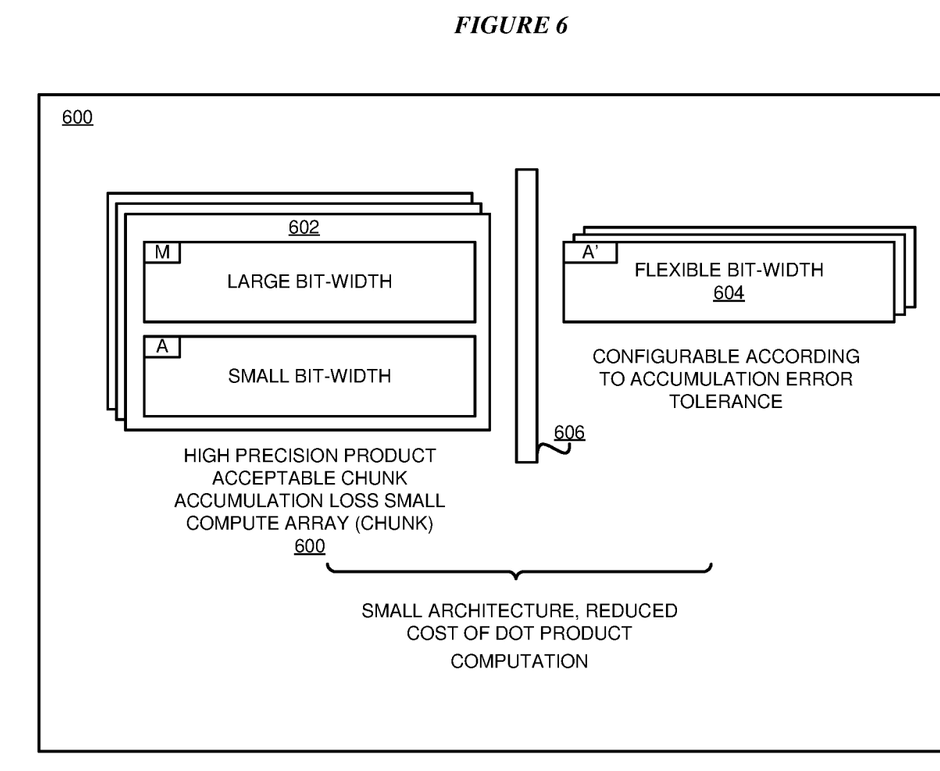
FIG. 6 depicts a block diagram of an example configuration for deep learning accelerator architecture with chunking GEMM in accordance with an illustrative embodiment.

With reference to FIG. 6, this figure depicts a block diagram of an example configuration for deep learning accelerator architecture with chunking GEMM in accordance with an illustrative embodiment. Dot-product architecture 600 is a non-limiting example configuration of a modified dot-product architecture, as described herein.

Dot-product architecture 600 includes a set of compute units 602. Each compute unit 602 is configured with a multiplier M and an accumulator A. Dot-product architecture 600 may be one array in a set of arrays operating in parallel. Furthermore, multiplier M and accumulator A may be fused together as a single unit, but are shown separately only for the clarity of the description.

Only as a non-limiting example, shown in this figure are multiplier M configured using a large bit-width FPU and accumulator A configured using a small bit-width FPU. This configuration allows products of high-precision and a chunk accumulation error that is below an accumulation error tolerance threshold. From this disclosure, those of ordinary skill in the art will be able to conceive many other bit-width configurations for compute unit 602, and the same are contemplated within the scope of the illustrative embodiments.

Dot-product architecture 600 further includes a set of accumulators "A'" 604 configured in an accumulator array. Component 606 is an example of application 506 in FIG. 5. Only as a non-limiting example, shown in this figure is an accumulator 604 that is flexibly configurable using different bit-width FPU, to produce a final dot-product that meet s a defined accumulation error tolerance threshold. From this disclosure, those of ordinary skill in the art will be able to conceive many other bit-width configurations for accumulator 604, and the same are contemplated within the scope of the illustrative embodiments.

The resulting dot-product architecture 600 is significantly smaller than dot-product architecture 300 in FIG. 3. Dot-product architecture 600 also produces a dot-product of higher accuracy for the same or less cost as compared to the dot-product and associated cost with dot-product architecture 300.

Figure 7:
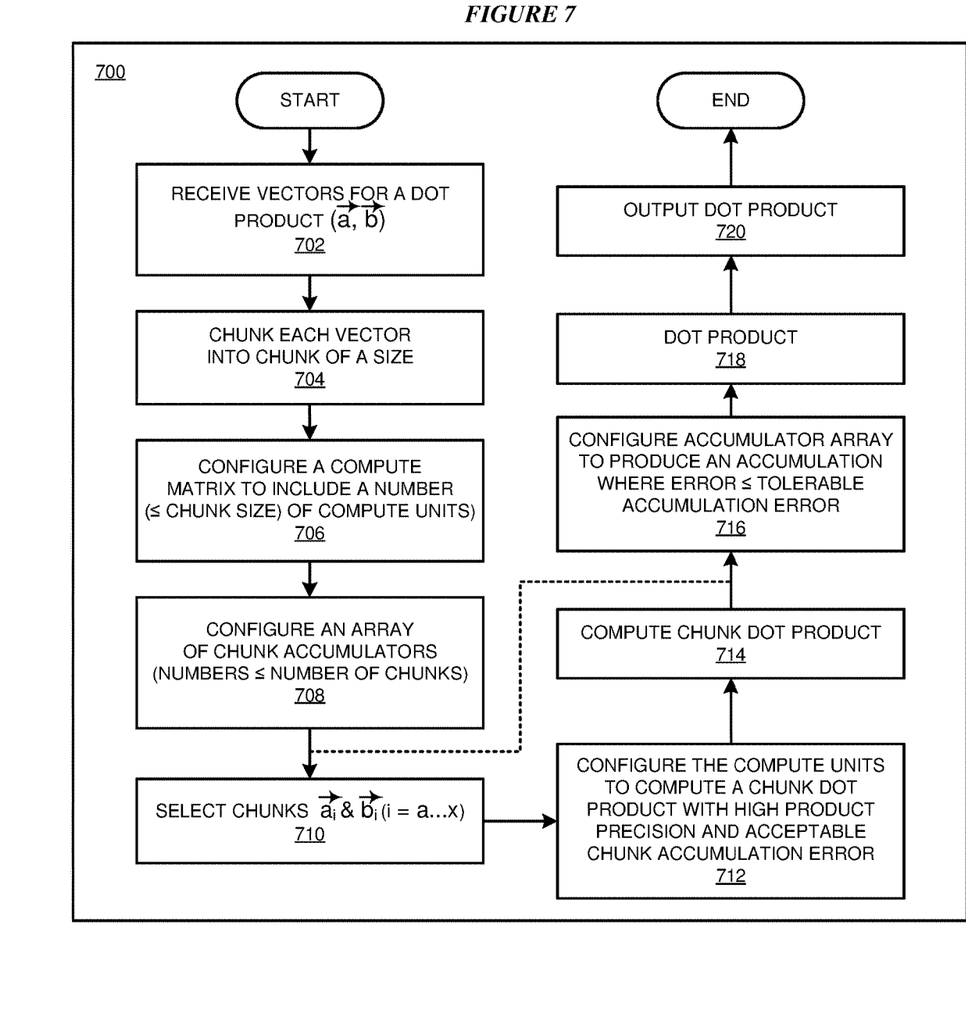
FIG. 7 depicts a flowchart of an example process for deep learning accelerator architecture with chunking GEMM in accordance with an illustrative embodiment.

With reference to FIG. 7, this figure depicts a flowchart of an example process for deep learning accelerator architecture with chunking GEMM in accordance with an illustrative embodiment. Process 600 can be implemented using dot-product architecture 600 in FIG. 6.

The dot-product architecture receives vectors for a dot-product (block 702). The dot-product architecture chunks each vector in chunks of a size (block 704). As described herein, in some cases, the chunks can be of differing sizes.

The dot-product architecture configures a compute matrix to include a number of compute units (block 706). This configuration uses a number of compute units, and the number is preferably less than or equal to the number of values in a chunk, i.e., less than or equal to the chunk size of a chunk that is to be processed.

The configuration of the compute matrix can be dynamic depending on the chunk size. When the chunk size is small (has a first specific size), the compute matrix can be configured to include or use a small number of compute units, i.e., only a number of compute units that is less than or equal to that first specific size; whereas when the chunk size is large (has a second specific size), the compute matrix can be configured to include or use a larger number of compute units, i.e., only a number of compute units that is less than or equal to that second specific size.

The dot-product architecture configures an array of accumulators (chunk accumulators, e.g., A' in FIG. 6) (block 708). This configuration uses a number of accumulators, and the number is preferably less than or equal to the number of chunks, i.e., less than or equal to the number of subsets of values formed from an input vector.

The configuration of the accumulator array can be dynamic depending on the number of chunks. When the number of chunks is small (a first specific number of partitions), the accumulator array can be configured to include or use a small number of accumulators, i.e., only a number of accumulators that is less than or equal to that first specific number of partitions; whereas when the number of chunks is large (a second specific number of partitions), the accumulator array can be configured to include or use a larger number of accumulators, i.e., only a number of accumulators that is less than or equal to that second specific number of partitions.

Suppose chunks a, b, c, ... x are made from vectors $\vec{a}$ and $\vec{b}$. The dot-product architecture selects a chunk pair, e.g., chunk $\vec{a}_k$ and $\vec{b}_k$ where k=a to x (block 710). The dot-product architecture configures the compute units in the compute matrix to compute a chunk dot-product for chunk pair $\vec{a}_k$ and $\vec{b}_k$, preferably with a high product precision and an acceptable chunk accumulation error (block 712). The dot-product architecture computes the chunk dot-product (block 714). The dot-product architecture repeats block 710-714 for various chunk pairs until all chunk pairs are exhausted and a set of chunk accumulation values have been produced.

The dot-product architecture configures the accumulator array to produce an accumulation from a set (or a subset) of chunk accumulation values (block 716). Preferably, this configuration produces an accumulation where the accumulation error does not deviate from an ideal dot-product by more than a deviation tolerance.

If a subset of chunk accumulation values is processed, the dot-product architecture produces the accumulation result for the subset of chunk accumulation values and repeats until all chunk accumulation values have been accumulated. When the entire set of chunk accumulation values has been accumulated, the dot-product architecture produces the dot-product for the input arrays from block 702 (block 718). The dot-product architecture outputs the dot-product in a suitable manner (block 720). The dot-product architecture ends process 700 thereafter.

Thus, a computer implemented method, system or apparatus, and computer program product are provided in the illustrative embodiments for deep learning accelerator architecture with chunking GEMM and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, including but not limited to computer-readable storage devices as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method comprising:
configuring a compute matrix comprising a set of compute units wherein each compute unit comprises a multiplier and an accumulator, each of the multiplier and the accumulator formed using at least one floating point unit (FPU);
configuring an accumulator array comprising a set of external accumulators;
operating the compute matrix to produce a chunk dot-product using a first chunk of a first input vector and a first chunk of a second input vector;
operating the accumulator array to output a dot-product of the first input vector and the second input vector using the chunk dot-product;
chunking the first input vector into a first set of chunks, each chunk in the first set of chunks including a non-overlapping subset of values from a first set of values in the first input vector, wherein the first set of chunks includes the first chunk of the first input vector; and
chunking the second input vector into a second set of chunks, each chunk in the second set of chunks including a non-overlapping subset of values from a second set of values in the second input vector, wherein the second set of chunks includes the first chunk of the second input vector.

2. The method of claim 1, further comprising:
changing, responsive to a precision of the chunk dot-product, a bit-width of an external accumulator in the accumulator array from a first bit-width to a second bit-width.

3. The method of claim 1, further comprising:
changing, responsive to a precision of values in the first chunk of the first input vector, a bit-width of the multiplier in the compute unit from a first bit-width to a second bit-width.

4. The method of claim 1, further comprising:
changing, responsive to a precision of a product expected to be produced by the multiplier, a bit-width of the accumulator in the compute unit from a first bit-width to a second bit-width.

5. The method of claim 1, wherein each chunk in the first set of chunks is of a first size.

6. The method of claim 5, wherein each chunk in the second set of chunks is of the first size.

7. The method of claim 1, wherein two chunks in the first set of chunks are of different sizes relative to each other.

8. The method of claim 1, further comprising:
configuring each external accumulator in the accumulator array to perform only an accumulation operation.

9. The method of claim 1, further comprising:
configuring an external accumulator in the accumulator array using a third FPU of a third bit-width.

10. The method of claim 1, wherein the third bit-width exceeds a second bit-width of a second FPU used in the accumulator of the compute unit.

11. The method of claim 1, further comprising:
configuring the multiplier using a first FPU of a first bit-width; and
configuring the accumulator using a second FPU of a second bit-width.

12. A computer usable program product comprising a computer-readable storage medium, and program instructions stored on the storage medium, the stored program instructions comprising:
program instructions to configure a compute matrix comprising a set of compute units wherein each compute unit comprises a multiplier and an accumulator, each of the multiplier and the accumulator formed using at least one floating point unit (FPU);
program instructions to configure an accumulator array comprising a set of external accumulators;
program instructions to operate the compute matrix to produce a chunk dot-product using a first chunk of a first input vector and a first chunk of a second input vector;
program instructions to operate the accumulator array to output a dot-product of the first input vector and the second input vector using the chunk dot-product;
program instructions to chunk the first input vector into a first set of chunks, each chunk in the first set of chunks including a non-overlapping subset of values from a first set of values in the first input vector, wherein the first set of chunks includes the first chunk of the first input vector; and
program instructions to chunk the second input vector into a second set of chunks, each chunk in the second set of chunks including a non-overlapping subset of values from a second set of values in the second input vector, wherein the second set of chunks includes the first chunk of the second input vector.

13. The computer usable program product of claim 12, further comprising:
program instructions to change, responsive to a precision of the chunk dot-product, a bit-width of an external accumulator in the accumulator array from a first bit-width to a second bit-width.

14. The computer usable program product of claim 12, further comprising:
program instructions to change, responsive to a precision of values in the first chunk of the first input vector, a bit-width of the multiplier in the compute unit from a first bit-width to a second bit-width.

15. The computer usable program product of claim 12, further comprising:
program instructions to change, responsive to a precision of a product expected to be produced by the multiplier, a bit-width of the accumulator in the compute unit from a first bit-width to a second bit-width.

16. The computer usable program product of claim 12, wherein the computer usable code is stored in a computer readable storage device in a data processing system, and wherein the computer usable code is transferred over a network from a remote data processing system.

17. The computer usable program product of claim 12, wherein the computer usable code is stored in a computer readable storage device in a server data processing system, and wherein the computer usable code is downloaded over a network to a remote data processing system for use in a computer readable storage device associated with the remote data processing system.

18. A computer system comprising a processor, a computer-readable memory, and a computer-readable storage device, and program instructions stored on the storage device for execution by the processor via the memory, the stored program instructions comprising:
   program instructions to configure a compute matrix comprising a set of compute units wherein each compute unit comprises a multiplier and an accumulator, each of the multiplier and the accumulator formed using at least one floating point unit (FPU);
   program instructions to configure an accumulator array comprising a set of external accumulators;
   program instructions to operate the compute matrix to produce a chunk dot-product using a first chunk of a first input vector and a first chunk of a second input vector;
   program instructions to operate the accumulator array to output a dot-product of the first input vector and the second input vector using the chunk dot-product;
   program instructions to chunk the first input vector into a first set of chunks, each chunk in the first set of chunks including a non-overlapping subset of values from a first set of values in the first input vector, wherein the first set of chunks includes the first chunk of the first input vector; and
   program instructions to chunk the second input vector into a second set of chunks, each chunk in the second set of chunks including a non-overlapping subset of values from a second set of values in the second input vector, wherein the second set of chunks includes the first chunk of the second input vector.

* * * * *